United States Patent [19]

Peng et al.

[11] Patent Number: 5,268,805
[45] Date of Patent: Dec. 7, 1993

[54] LOW INERTIA WINCHESTER DISK DRIVE ACTUATOR

[75] Inventors: Chia-Yen Peng, Chatsworth; Dan L. Kilmer, Reseda, both of Calif.

[73] Assignee: Micropolis Corporation, Chatsworth, Calif.

[21] Appl. No.: 745,869

[22] Filed: Aug. 16, 1991

[51] Int. Cl.$^5$ .............................................. G11B 5/55
[52] U.S. Cl. .................................... 360/106; 360/75; 360/104
[58] Field of Search ............... 360/103, 104, 105, 106, 360/75, 97.01, 73.03

[56] References Cited

U.S. PATENT DOCUMENTS

| | | | |
|---|---|---|---|
| 4,716,478 | 11/1987 | Walsh et al. | 360/104 |
| 4,843,503 | 6/1989 | Hazebrouck et al. | 360/106 |
| 4,949,194 | 8/1990 | MacPherson et al. | 360/106 |
| 5,014,146 | 5/1991 | Takatsuka et al. | 360/106 |
| 5,119,537 | 6/1992 | Hamanaka et al. | 360/106 |
| 5,126,904 | 6/1992 | Sakurai | 360/106 |
| 5,161,077 | 11/1992 | Jabbari | 360/106 |

*Primary Examiner*—Paul M. Dzierzynski
*Assistant Examiner*—Kim-Kwok Chu
*Attorney, Agent, or Firm*—Poms, Smith, Lande & Rose

[57] ABSTRACT

The head positioner for a Winchester type hard disk drive digital storage system includes a main rotating metal body portion made of magnesium or other lightweight metal and having outwardly extending, integral, head positioning arms. The shape of the arms is such that the rotary moment of inertia is minimized while maintaining high resistance to vertical and in-plane bending, torsional twisting and shock, which cause the head to move off track. The integral arms are tapered in a curved fashion having an inner base portion and an outer narrower end to which a load beam and a magnetic head are secured. Three openings are provided in each of the integral arms, including a generally arch shaped opening adjacent the base of each arm and two outer generally oval openings tapering down in their transverse dimensions generally corresponding to the tapering of the arms.

20 Claims, 2 Drawing Sheets

FIG. 4  FIG. 5  FIG. 6

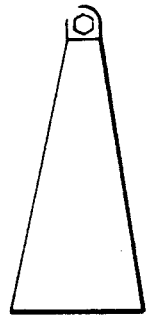
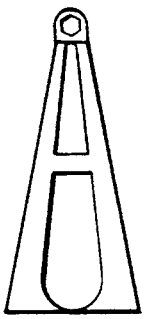
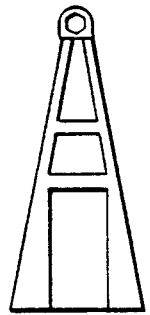

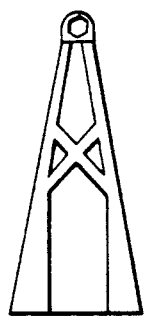
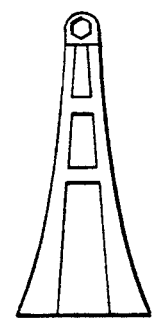
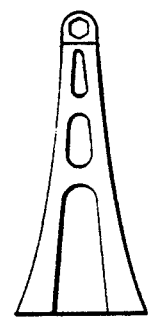

| HEAD POSITIONER ||||||||| |
|---|---|---|---|---|---|---|---|---|
| DESIGN FEATURES | H MIL | J INERTIA | BAL. IN-OZ | VERTICAL BENDING Hz | IN-PLANE BENDING Hz | TORSION/ TWISTING Hz | 2ND VER. BENDING Hz | $D_{max}$ MIL |
| SOLID-ARM* (FIG. 4) | 75 | .3908 | .11110 | 1029 | 7555 | 9431 | 4844 | 2.8 |
| FIG. 5 | 65 | .2095 | .05692 | 685 | 5336 | 5785 | 3635 | 5.6 |
| FIG. 6 | 75 | .2086 | .05683 | 769 | 5127 | 6346 | 3996 | 4.4 |
| FIG. 7 | 75 | .2071 | .05628 | 788 | 5540 | 6378 | 4179 | 4.2 |
| FIG. 8 | 75 | .1994 | .05409 | 786 | 5202 | 8061 | 4299 | 4.1 |
| FIG. 9 | 75 | .2068 | .05600 | 789 | 5486 | 8200 | 4303 | 4.0 |

NOTE: EQUIVALENT MASS OF TWO TYPE 14 HGA'S ARE ADDED TO THE ARM TIP.
H: ARM THICKNESS
J: INERTIA
BAL: MASS BALANCE
$D_{max}$: MAXIMUM ARM TIP DEFLECTION DURING 100 g HALF-SINE SHOCKS IN z-DIR.
*: USED AS A BASELINE FOR THE REST INERTIA-REDUCED DESIGNS.

LOW INERTIA WINCHESTER DISK DRIVE ACTUATOR

FIELD OF THE INVENTION

This invention relates to hard magnetic disk memory head positioning devices.

BACKGROUND OF THE INVENTION

In the field of storage systems using hard magnetic disks, also known as Winchester drives, the speed at which data is read from and written to the disks is an important measure of performance. A hard disk drive that reads and writes data quickly complements a fast computer. However, a hard disk drive that reads and writes data slowly detracts from the performance of an otherwise fast computer. Thus, as computers are designed to operate at ever-higher speeds, components which do not operate rapidly, or which have high operating power requirements are stumbling blocks which are encountered.

One such component is the head positioner that carries the magnetic heads to the appropriate tracks on the disks. The rotary moment of inertia of the positioner arms forming part of the head positioner is a critical factor in determining the speed at which the heads can be positioned to read data from the storage disks. Solid head positioner arms have been widely used for their rigidity, but have the disadvantage of a relatively high moment of inertia. It has also been proposed to use open arm constructions to reduce the moment of inertia. As the rotary moment of inertia is reduced, the arm offers less resistance to rotary motion and therefore can be positioned more rapidly and with less power. However, certain prior art positioners, including rotary positioners, have relatively long and flexible arms. Such elongated head positioner arms tend to have modes of vibration which are easily excited during normal operation of the disc drive. Hence, as the positioning speed increases, the arms are more prone to bending, twisting and vibration, which put the magnetic heads out of alignment with the data tracks and adversely affect the time required for the heads to settle after a "seek", changing from one track to another.

U.S. Pat. No. 4,843,503 discloses one attempt to provide reduced inertia arms, and also includes a damping device formed of a compressible visco-elastic material which is inserted between at least two adjacent head arms to reduce the uncontrolled vibratory motion, apparently due to the open configuration of the arms. The added damping device adds more rotary inertia to the arms, thereby increasing the power required to rotate the arms a certain distance in a given time.

In addition to the problem with uncontrolled vibration, previous attempts to reduce the rotary inertia of head positioning arms have failed for other reasons. U.S. Pat. No. 4,805,055 discloses an arm provided with four triangular-shaped holes which reduce the weight and rotary inertia. A serious drawback of this design is that counterweights must be used to balance the arm, thereby adding back at least some portion of the inertia that the holes are intended to reduce. Another approach is taken in U.S. Pat. No. 4,716,478, which discloses an arm provided with three triangular-shaped holes, each with a vertex pointed at the vertex of another triangle. Unfortunately, the arm profile is excessively wide and assymetrical, causing the rotary inertia to be greater than necessary.

Accordingly, a principal object of the present invention is to provide an improved head positioner arm with which the magnetic heads can be positioned with greater speed and less power, and without significant bending, twisting, vibration and the like.

SUMMARY OF THE INVENTION

The present invention achieves the foregoing object through the use of a main rotatable head positioning body having integral outwardly extending arms which connect directly to the load beams to which the magnetic heads are secured. Each integral arm includes rounded openings which reduce the rotary inertia, with cross-braces located to minimize the inertia while maintaining favorable structural characteristics. The rotary inertia is further reduced with a tapered, curving arm profile which tapers from a wider inner base portion to a narrower outer end to which the load beams are attached. The head positioner has a lower rotary inertia than a variety of other arm designs, and it retains high resistance to vertical and in-plane bending, torsional twisting, and shock, which would tend to shift the magnetic heads off track.

An additional significant aspect of the invention is that the head positioner arm is made of a lightweight metal, which further reduces the rotary inertia. For purposes of illustration, the arm can be made of magnesium, which has both high strength and lightweight characteristics superior to the aluminum that has generally been used in prior art head positioners.

In addition to the advantage of increased positioning speed, this invention provides the collateral advantage of reducing the power required to position the arm in a given time. Since the power required to position the arm is a function of the rotary inertia of arm, the power requirement is less for a low-inertia design than it is for a traditional design. Such is the case with the present invention, which has outstanding low-inertia characteristics.

Other objects, features, and advantages of the invention will become apparent from a consideration of the following detailed description and from the accompanying drawings.

BRIEF DESCRIPTION OF THE DRAWINGS

FIG. 4 is a top view of a solid head positioner arm which is used as a baseline for comparison with the rest of the inertia-reduced designs;

FIG. 5-8 are top views of various head positioner arm designs presented for the purpose of comparison with the optimal head positioner arm configuration of FIGS. 2, 3 and 9;

FIG. 9 is a top view of the optimal head positioner arm as described below; and

FIG. 10 is a tabular summary of design and performance data from the six head positioner arm designs presented in FIGS. 4 through 9.

DETAILED DESCRIPTION OF THE PREFERRED EMBODIMENT

Figure 1:
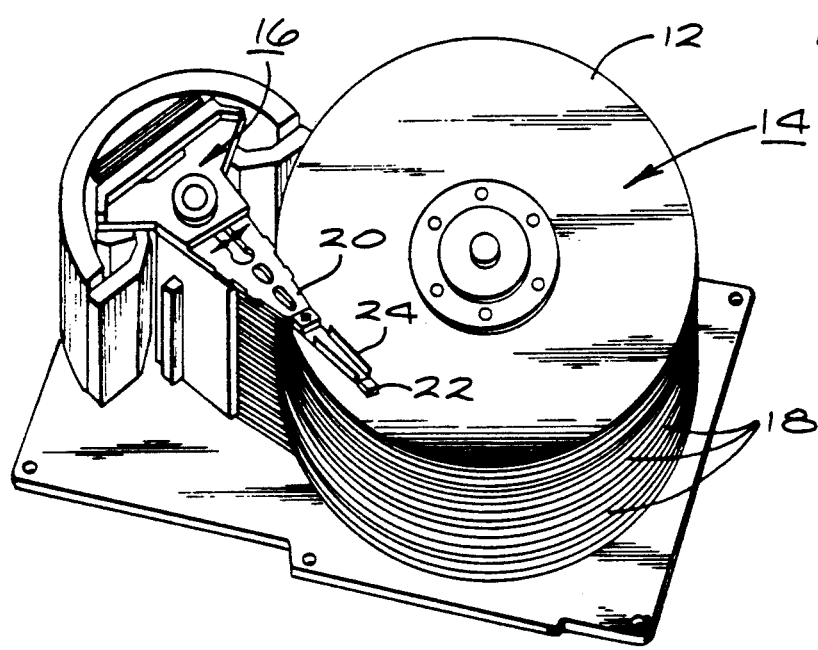
FIG. 1 is a perspective view of a Winchester or hard disk drive with the upper cove removed.

Referring now to the drawings, FIG. 1 illustrates the disk drive unit 12 of a type in keeping with the subject of this invention. The contents of the unit typically comprise a memory disk unit 14 operating in cooperation with a magnetic head positioning assembly 16.

Memory disk unit 14 comprises a plurality of rigid storage disks 18 having magnetizable surfaces and which are stacked coaxially in a tandem, spaced relationship and rotate about a common axis by means of a central electric motor, including a central stator; and, relative to head positioning assembly 16, having a plurality of movable, interleaved head positioning arms 20, each having one or more magnetic heads 22 mounted thereon for reading and writing information magnetically on disks 18 as the integral body including arms 20 is rotated about a stationary axis, causing the arms to interleave into and out of memory disk unit 14.

Figure 2:
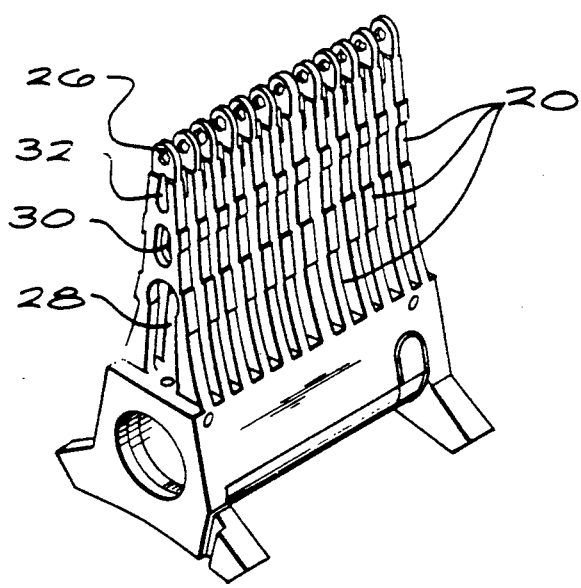
FIG. 2 is a perspective view of a head positioner having an integral body with a plurality of integral arms extending outward.

FIG. 2 shows a perspective view of the integral body including a plurality of head positioning arms 20 extending outward. Flexible load beams 24, which carry the magnetic heads 22, attach to the head positioning arms 20 at hole 26. Openings 28, 30 and 32 are designed to reduce the rotary moment of inertia while maintaining resistance to harmonic dynamic response.

Figure 3:
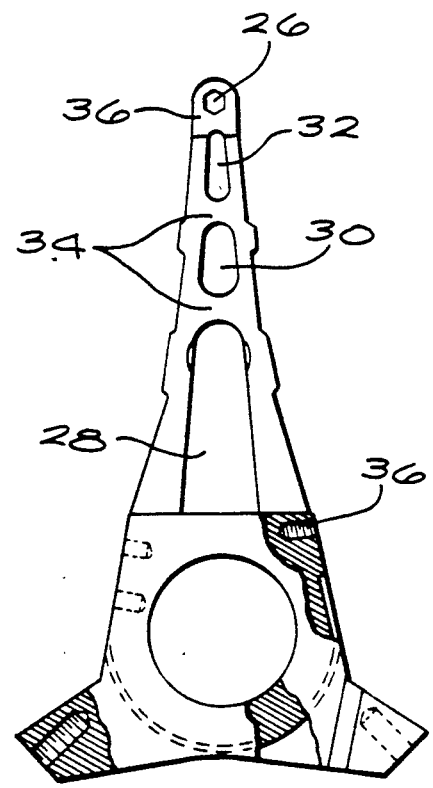
FIG. 3 is a top view of the head positioner of FIG. 2, showing the shape of the head positioner arms.

FIG. 3 shows a top view of the integral body showing the configuration of the arms. An arch-shaped opening 28 adjoins the wider base portion 36 of the head positioning arm. Two tapered oval openings 30 and 32 reduce the rotary inertia in the narrower outer-end 36 of the head positioning arm. The head positioning arm supports the flexible load beam 24, which carries the magnetic heads 22 and which are secured at hole 26. The cross braces 34 are positioned for best resonant frequency vs. low inertia characteristics.

FIG. 4 is a top view of a solid head positioner arm which is used as a baseline for comparison with the rest of the inertia-reduced designs. The integral arms are tapered in a linear fashion from an inner base portion to a narrower outer end to which the load beams are attached.

FIG. 5 is a top view of a reduced-inertia head positioner. The integral arms are tapered in a linear fashion from an inner base portion to a narrower outer end to which the load beams are attached. Each integral arm includes two openings. The opening adjacent to the base of each arm is an elongated inverted arch shape. The outer arch-shaped opening sharply tapers down in its transverse dimension generally corresponding to the tapering of the arm.

FIG. 6 is a top view of another reduced-inertia head positioner. The integral arms are tapered in a linear fashion from an inner base portion to a narrower outer end to which the load beams are attached. Each integral arm includes three openings. The opening adjacent to the base of each arm is rectangular shaped, and it does not taper down corresponding to the tapering of the arm. The middle opening is a trapezoid which tapers down in its transverse dimension generally corresponding to the tapering of the arm. The outer opening is a nearly-triangular trapezoid which also tapers down in its transverse dimension generally corresponding to the tapering of the arm.

FIG. 7 is a top view of another reduced-inertia head positioner. The integral arms are tapered in a linear fashion from a wider inner base portion to a narrower outer end to which the load beams are attached. Each integral arm includes four openings. The opening adjacent to the base of each arm is generally rectangular shaped with a diamond shaped tip o the end opposite to the base. The middle two triangular openings are formed by the intersection of two crossing braces. The outer opening is a cravat shape which tapers down in its transverse dimension generally corresponding to the tapering of the arm.

FIG. 8 is a top view of another reduced-inertia head positioner. The integral arms are tapered in a generally curved fashion. Each integral arm includes three generally rectangular openings. The generally rectangular opening adjacent to the base of each arm tapers slightly in a linear fashion. The generally rectangular shaped middle opening tapers slightly in a linear fashion. The generally rectangular shaped outer opening also tapers slightly in a linear fashion.

FIG. 9 is the optimized reduced-inertia head positioner as described above. The integral arms are tapered in a generally curved fashion, and the curvature of the profile is a significant aspect of the present invention for purposes of reducing the rotary moment of inertia. In addition, each integral arm includes three openings, including a generally arch-shaped opening adjacent the base of each arm and two outer generally oval openings tapering down in their transverse dimensions generally corresponding to the tapering of said arms. It may also be noted that the cross brace immediately above the inner arch shaped opening is about half way along the length of the arm toward the opening to which the load beam is secured.

FIG. 10 is a summary of design and performance data from the six head positioner arm designs presented in FIGS. 4 through 9. The data presented includes the arm thickness (H); the rotary inertia (J); the mass balance; the first natural frequencies of vertical bending, in-plane bending, and torsion/twisting; the second natural frequency of vertical bending; and the maximum arm tip deflection under half-sine shock loading in the vertical direction ($D_{MAX}$). The arm thickness is assumed to be constant or near-constant throughout the head positioner arm. The rotary inertia is the resistance to rotation presented by the mass of the arm, expressed in milli-ounce-inch-seconds-squared or "MOISS", which is a standard unit of measure within the hard disk industry. The mass balance represents the difference in the mass of the coil side of the armature and the mass of the arm side of the armature. The mass balance should be as near zero as possible so as to avoid having to use balance weights, which would tend to increase the rotary inertia of the arm.

Continuing the description of FIG. 10, the first and second natural frequencies of vertical bending, and the first natural frequencies of in-plane bending and torsion/twisting represent important characteristics of the armature structure which determine its dynamic response to input forces. In general, an armature with higher natural frequencies resists vibration better than an armature with lower natural frequencies. The maximum arm tip deflection is measured under a 100 g shock load applied to the rigid cast housing in parallel to the shaft, where "g" represents gravity. The data in FIG. 10 was obtained numerically with a computer program. The structural model includes a point mass at the tip of the arm to simulate the combined weight of the flexible load beam, the two magnetic heads, and various other accompanying devices. The point mass is referenced in FIG. 10 in terms of Head Gimbel Assemblies ("HGA's").

As can be seen from FIG. 10, the present invention FIG. 9 has outstanding performance in all categories. The rotary inertia and balance of the design in FIG. 9 is improved upon only by the design in FIG. 8. However, the design in FIG. 9 outperforms the design in FIG. 8 in all other categories. Specifically, the design in FIG. 9 has higher natural frequencies of vertical and in-plane bending, torsion and twisting. Furthermore, the maximum arm tip deflection of the present invention is the lowest of the group. The solid arm of FIG. 4 outperforms the inertia-reduced designs in terms of dynamic structural response and maximum tip deflection. However, this performance comes at the expense of an unacceptably high rotary inertia and a poor mass balance. The optimal design of FIG. 9 has a rotary inertia about half that of the solid arm and also has an improved mass balance, while approximating the performance of the solid arm in other respects. It is also noted that the optimal design of FIG. 9 has high resistance to torsion/twisting, which would tend to take the magnetic heads off-track.

In conclusion, it is to be understood that the foregoing detailed description and the accompanying drawings are merely illustrative of one preferred embodiment of the invention. Various changes and modifications may be employed without departing from the spirit and scope of the invention. Thus, by way of example and not of limitation, openings having slightly different shapes may be employed and the number of openings might be increased or decreased. Accordingly, it is to be understood that the present invention is not limited to the arrangements precisely as shown and described hereinabove.

What is claimed is:

1. A hard disk drive storage system comprising:
a plurality of hard magnetic storage disks;
a plurality of magnetic head means for reading and writing digital information on said storage disks;
means including a head positioner for shifting the position of said magnetic heads across the surface of said disks;
said head positioner constituting an integral unitary body formed of a lightweight metal and a plurality of integral arms extending outward toward said disks;
said integral arms including a plurality of apertures thereon and being tapered in an inwardly curved fashion having an inner base portion and an outer narrower end to which a load beam and a magnetic head are secured; and
said apertures comprising three openings, including a generally arch-shaped opening adjacent the base of each arm and two outer generally oval openings tapering down in their transverse dimensions generally corresponding to the tapering of said arms;
whereby the head positioner including the apertured arms has a lower inertia as compared with a head positioner with solid arms, and retains high resistance to torsional twisting which would tend to shift the magnetic heads off track.

2. A hard disk drive storage system as defined in claim 1 wherein said hard disks are spaced apart from one another and are mounted coaxially.

3. A hard disk drive storage system as defined in claim 1 wherein said arms each include a cross brace extending transversely across each said arm about one-half way along the length of each said arm.

4. A hard disk drive storage system as defined in claim 1 wherein said openings in said integral arms remove between 40 and 60 per cent of the material that would be found in solid arms of the same dimensions.

5. A hard disk drive storage system as defined in claim 1
wherein said head positioner is formed of magnesium.

6. A hard disk drive storage system as defined in claim i
further including a hole in the end of each of the integral arms for the purpose of securing the load beams which carry the magnetic heads.

7. A hard disk drive storage system as defined in claim I
wherein the inner base portion of the tapered integral arms is between three and four times the width of the outer narrower end.

8. A hard disk drive storage system as defined in claim 1
wherein the generally arch-shaped opening adjacent the base of each arm is between two and three times the length of the two outer generally oval-shaped openings.

9. A hard disk drive storage system comprising:
a plurality of hard magnetic storage disks;
a plurality of magnetic head means for reading and writing digital information on said storage disks;
means including a head positioner for shifting the position of said magnetic heads across the surface of said disks;
said head positioner including an integral unitary body with a plurality of integral arms extending outward toward said disks;
said integral arms including a plurality of apertures thereon and being tapered having an inner base portion and an outer narrower end to which a load beam and a magnetic head are secured; and
said apertures comprising a plurality of rounded openings to minimize the rotary moment of inertia of the arms;
whereby the head positioner including the apertured arms has a lower rotary moment of inertia as compared to a head positioner with solid arms, and retains the resistance to vertical and in-plane bending, torsional twisting and shock necessary to keep the heads on track.

10. A hard disk drive storage system as defined in claim 9
wherein said hard magnetic storage disks are spaced apart from one another and are mounted coaxially.

11. A hard disk drive storage system as defined in claim 9
wherein said arms each include a cross brace extending transversely across each said arm about one-half way along the length of each said arm.

12. A hard disk drive storage system as defined in claim 9
wherein said head positioner is formed of magnesium.

13. A hard disk drive storage system as defined in claim 9
wherein said openings in said integral arms remove between 40 and 60 per cent of the material that would be found in solid arms of the same dimensions.

14. A hard disk drive storage system as defined in claim 9 further including a hole in the end of each of the integral arms for the purpose of securing the load beams which carry the magnetic heads.

15. A hard disk storage system comprising:
   at least four hard storage disks spaced apart from one another and mounted coaxially, said disks having magnetizable surfaces;
   means for rotating said storage disks;
   a plurality of magnetic heads for reading and writing digital information on the surfaces of said disks;
   means including a head positioner for shifting the position of said magnetic heads across the surface of said disks;
   means for mounting said head positioner to rotate about a central axis;
   said head positioner including an integral unitary body and a plurality of integral arms which extend outwardly substantially radially toward said disks;
   said integral body being a single homogeneous structure free of any joints;
   said integral arms including a plurality of apertures thereon and being tapered in an inwardly curved fashion having an inner base portion and an outer narrower end to which a load beam and a magnetic head are secured; and
   said apertures comprising a plurality of openings, including a generally arch shaped opening adjacent to the base of each arm and at least one additional rounded outer opening;
   whereby the head positioner including the apertured arms has a lower rotary moment of inertia as compared to a head positioner with solid arms, and retains high resistance to vertical and in-plane bending, torsional twisting and shock which would tend to shift the magnetic heads off track.

16. A hard disk drive storage system as defined in claim 15
   further including a hole in the end of each of the integral arms for the purpose of securing the load beams thereto.

17. A hard disk drive storage system as defined in claim 15
   wherein said openings in said integral arms remove between 40 and 60 per cent of the material that would be found in solid arms of the same dimensions.

18. A hard disk drive storage system as defined in claim 15
   wherein said head positioner is formed of magnesium.

19. A hard disk drive storage system as defined in claim 15
   wherein the inner base portion of the tapered integral arms is between three and four times the width of the outer narrower end.

20. A hard disk drive storage system as defined in claim 15
   wherein the generally arch-shaped opening adjacent the base of each arm is between two and three times the length of the two outer generally oval-shaped openings.

* * * * *